(12) United States Patent
Qi

(10) Patent No.: US 12,299,986 B1
(45) Date of Patent: May 13, 2025

(54) AI-ENHANCED HOME STORAGE SYSTEM

(71) Applicant: Nana Qi, Dartmouth, MA (US)

(72) Inventor: Nana Qi, Dartmouth, MA (US)

( * ) Notice: Subject to any disclaimer, the term of this patent is extended or adjusted under 35 U.S.C. 154(b) by 0 days.

(21) Appl. No.: 18/588,098

(22) Filed: Feb. 27, 2024

Related U.S. Application Data

(63) Continuation-in-part of application No. 18/405,576, filed on Jan. 5, 2024.

(51) Int. Cl.
| | |
|---|---|
| *G06V 20/50* | (2022.01) |
| *G06K 7/14* | (2006.01) |
| *G06T 7/73* | (2017.01) |
| *G06T 11/00* | (2006.01) |
| *G06V 10/764* | (2022.01) |
| *G06V 10/77* | (2022.01) |
| *G06V 10/94* | (2022.01) |
| *G06V 20/40* | (2022.01) |
| *G06V 20/68* | (2022.01) |

(52) U.S. Cl.
CPC ........... *G06V 20/50* (2022.01); *G06K 7/1417* (2013.01); *G06T 7/73* (2017.01); *G06T 11/00* (2013.01); *G06V 10/764* (2022.01); *G06V 10/77* (2022.01); *G06V 10/945* (2022.01); *G06V 20/41* (2022.01); *G06V 20/68* (2022.01); *G06T 2207/10016* (2013.01); *G06T 2207/20081* (2013.01)

(58) Field of Classification Search
CPC ...... G06V 20/50; G06V 10/764; G06V 10/77; G06V 10/945; G06V 20/41; G06V 20/68; G06K 7/1417; G06T 7/73; G06T 11/00; G06T 2207/10016; G06T 2207/20081; G06F 3/04815; G06F 3/011; G06F 16/29; G06F 16/587
USPC .......................................... 707/737; 382/103
See application file for complete search history.

(56) References Cited

U.S. PATENT DOCUMENTS

| | | | | |
|---|---|---|---|---|
| 2014/0171039 | A1* | 6/2014 | Bjontegard | H04L 67/535 |
| | | | | 455/414.1 |
| 2017/0372403 | A1* | 12/2017 | Jouhikainen | G06Q 20/202 |
| 2019/0073831 | A1* | 3/2019 | Kim | G06F 3/011 |
| 2019/0147521 | A1* | 5/2019 | Agarwal | G06Q 30/0619 |
| | | | | 705/26.8 |
| 2020/0090404 | A1* | 3/2020 | Rakshit | G06T 19/006 |
| 2020/0098460 | A1* | 3/2020 | Banks | G16H 40/20 |
| 2022/0114352 | A1* | 4/2022 | Chang | G06K 7/10297 |
| 2023/0422324 | A1* | 12/2023 | Asakura | H04W 76/14 |

* cited by examiner

*Primary Examiner* — Phong H Nguyen
(74) *Attorney, Agent, or Firm* — Law Office of Ilya Libenzon

(57) ABSTRACT

The AI-Enhanced Home Storage System of the present invention integrates a combination of physical storage containers and a dedicated mobile application. Leveraging advanced artificial intelligence (AI) and image recognition technology, the system is configured to streamline the process of categorizing, retrieving, and organizing items stored within the household. Through intuitive interfaces and smart categorization, the system offers users an efficient and convenient way to track and locate their belongings within the designated storage spaces.

11 Claims, 8 Drawing Sheets

AI-ENHANCED HOME STORAGE SYSTEM

TECHNICAL FIELD

Embodiments disclosed herein relate generally to a home storage system, and more specifically to an AI-enhanced home storage system designed to simplify and optimize the organization and retrieval of items within a household.

BACKGROUND ART

Difficulty in tracking and locating household items within storage spaces leads to frequent instances of misplaced belongings, causing inconvenience and frustration. Users often struggle to remember the specific locations (cabinets, drawers, etc.) where items are stored, leading to inefficiencies in retrieval and organization of essential items, such as clothing and other household necessities. Currently, there is a notable absence of commercially available systems that effectively address these challenges, highlighting a pressing need for an innovative solution.

The AI-Enhanced Home Storage System of the present invention aims to address this challenge by integrating a combination of physical storage containers and a dedicated mobile application. Leveraging advanced artificial intelligence (AI) and image recognition technology, the system streamlines the process of categorizing, retrieving, and organizing items stored within the household. Through intuitive interfaces and smart categorization, the system offers users an efficient and convenient way to track and locate their belongings within the designated storage spaces.

SUMMARY OF THE EMBODIMENTS

The AI-Enhanced Home Storage System encompasses both a physical storage container set and an associated mobile application. The system leverages artificial intelligence (AI) and image recognition technology to streamline the process of item categorization, retrieval, and organization.

The method for streamlining the process of time categorization, retrieval, and organization is provided. The method includes the steps of scanning a QR code affixed to a storage container using a smartphone equipped with a QR code scanner application; retrieving the encoded information embedded in the QR code; initiating a recording process through the smartphone application upon scanning the QR code, wherein the recording process captures the loading of household items into the container through video or photos; recording information about the items being loaded into the container, including item types, quantities, and visual references such as photos and/or videos, associating this recorded information with the unique identifier of the container; and storing the recorded information in the application's database for future reference and easy retrieval of items by referencing the container's unique identifier.

The system for streamlining the process of time categorization, retrieval, and organization is also provided. The system includes one or more processors; and one or more memories having stored thereon instructions that, when executed by the one or more processors, cause the one or more processors to utilize a smartphone equipped with a QR code scanner application to scan a QR code attached to a storage container; retrieve the encoded information embedded in the QR code; initiate a recording process through the smartphone application upon scanning the QR code, wherein the recording process captures the loading of household items into the container through video or photos; record information about the items being loaded into the container, including item types, quantities, and visual references such as photos and/or videos, associating this recorded information with the unique identifier of the container; and store the recorded information in the application's database for future reference and easy retrieval of items by referencing the container's unique identifier.

In accordance with some embodiments of the present invention, the system can further include at least one storage container adapted to store household items therein, the storage container having at least one QR-code sticker affixed to the storage container and a smartphone stand for securely and releasably holding the smartphone. In some instances, the system can further include one or more labels, and/or one or more NFC readers.

Other aspects, embodiments and features of the undershirt and method will become apparent from the following detailed description when considered in conjunction with the accompanying figures. The accompanying figures are for schematic purposes and are not intended to be drawn to scale. In the figures, each identical or substantially similar component that is illustrated in various figures is represented by a single numeral or notation. For purposes of clarity, not every component is labeled in every figure. Nor is every component of each embodiment of the device and method shown where illustration is not necessary to allow those of ordinary skill in the art to understand the device and method.

BRIEF DESCRIPTION OF THE DRAWINGS

The preceding summary, as well as the following detailed description of the disclosed undershirt and method, will be better understood when read in conjunction with the attached drawings. It should be understood, however, that neither the device nor the method is limited to the precise arrangements and instrumentalities shown.

DETAILED DESCRIPTION OF SPECIFIC EMBODIMENTS

Figure 1:
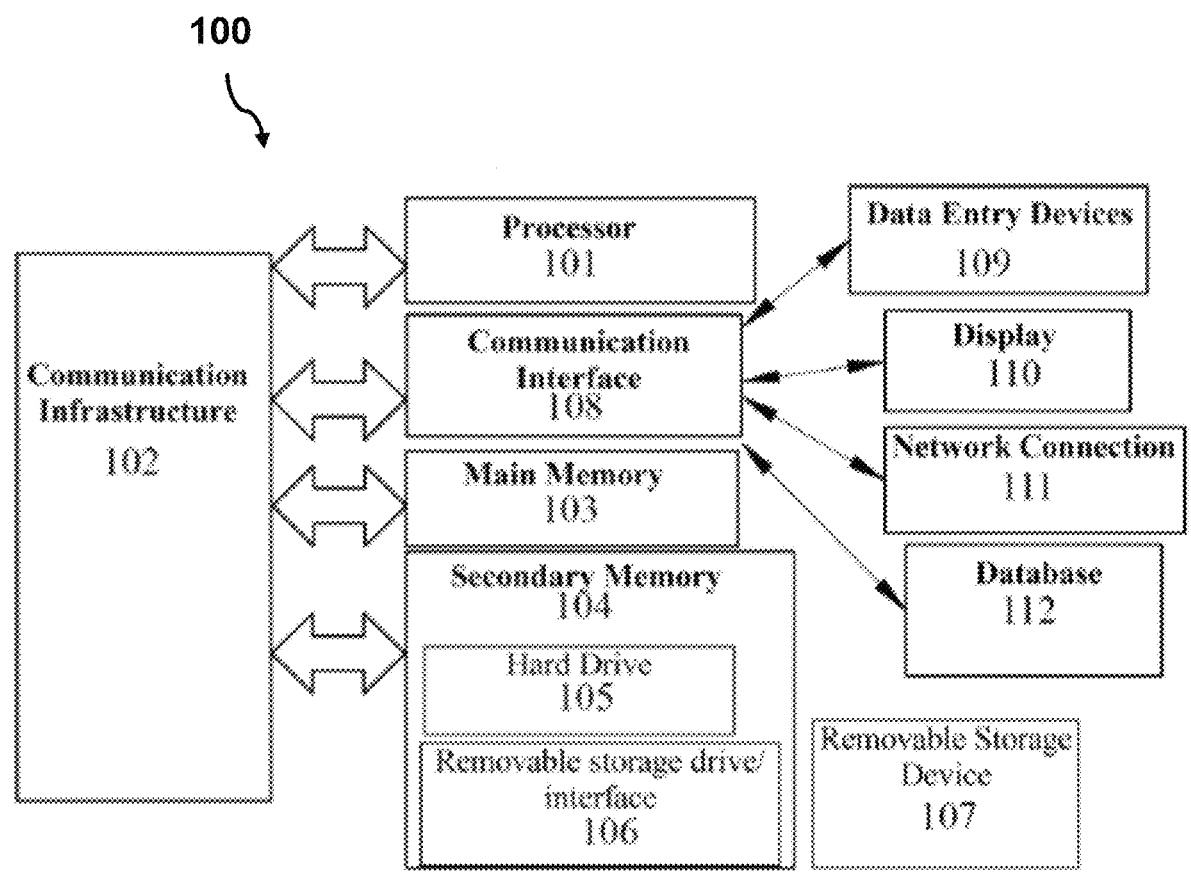
FIG. 1 is a block diagram depicting an example of a computing device as described herein.

The subject matter of the present invention now will be described more fully hereinafter with reference to the accompanying drawings, in which some, but not all embodiments of the subject matter of the present invention are shown. Like numbers refer to like elements throughout. The subject matter of the present invention may be embodied in many different forms and should not be construed as limited to the embodiments set forth herein; rather, these embodiments are provided so that this disclosure will satisfy applicable legal requirements. Indeed, many modifications and other embodiments of the subject matter of the present invention set forth herein will come to mind to one skilled in the art to which the subject matter of the present invention pertains having the benefit of the teachings presented in the foregoing descriptions and the associated drawings. All illustrations of the drawings are for the purpose of describing selected versions of the present invention and are not intended to limit the scope of the present invention. Therefore, it is to be understood that the subject matter of the present invention is not to be limited to the specific embodiments disclosed and that modifications and other embodiments are intended to be included within the scope of the appended claims.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and example of the present disclosure and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term-differs in any way from any particular dictionary definition of such term, it is intended that the meaning of the term as understood by the ordinary artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list".

Some embodiments of the disclosed system and methods will be better understood by reference to the following comments concerning computing devices. A "computing device" 100 may be defined as including personal computers, laptops, tablets, smart phones, and any other computing device capable of supporting an application as described herein. The system and method disclosed herein will be better understood in light of the following observations concerning the computing devices that support the disclosed application and concerning the nature of web applications in general.

Referring now to the drawings in detail. An exemplary computing device is illustrated by FIG. 1. The processor 101 may be a special purpose or a general-purpose processor device. As will be appreciated by persons skilled in the relevant art, the processor device 101 may also be a single processor in a multi-core/multiprocessor system, such system operating alone, or in a cluster of computing devices operating in a cluster or server farm. The processor 101 is connected to a communication infrastructure 102, for example, a bus, message queue, network, or multi-core message-passing scheme.

The computing device also includes a main memory 103, such as random access memory (RAM), and may also include a secondary memory 104. Secondary memory 104 may include, for example, a hard disk drive 105, a removable storage drive or interface 106, connected to a removable storage unit 107, or other similar means. As will be appreciated by persons skilled in the relevant art, a removable storage unit 107 includes a computer usable storage medium having stored therein computer software and/or data. Examples of additional means creating secondary memory 104 may include a program cartridge and cartridge interface (such as that found in video game devices), a removable memory chip (such as an EPROM, or PROM) and associated socket, and other removable storage units 107 and interfaces 106 which allow software and data to be transferred from the removable storage unit 107 to the computer system. In some embodiments, to "maintain" data in the memory of a computing device means to store that data in that memory in a form convenient for retrieval as required by the algorithm at issue, and to retrieve, update, or delete the data as needed.

The computing device may also include a communications interface 108. The communications interface 108 allows software and data to be transferred between the computing device and external devices. The communications interface 108 may include a modem, a network interface (such as an Ethernet card), a communications port, a PCMCIA slot and card, or other means to couple the computing device to external devices. Software and data transferred via the communications interface 108 may be in the form of signals, which may be electronic, electromagnetic, optical, or other signals capable of being received by the communications interface 108. These signals may be provided to the communications interface 108 via wire or cable, fiber optics, a phone line, a cellular phone link, and radio frequency link or other communications channels. Other devices may be coupled to the computing device 100 via the communications interface 108. In some embodiments, a device or component is "coupled" to a computing device 100 if it is so related to that device that the product or means and the device may be operated together as one machine. In particular, a piece of electronic equipment is coupled to a computing device if it is incorporated in the computing device (e.g. a built-in camera on a smart phone), attached to the device by wires capable of propagating signals between the equipment and the device (e.g. a mouse connected to a personal computer by means of a wire plugged into one of the computer's ports), tethered to the device by wireless technology that replaces the ability of wires to propagate signals (e.g. a wireless BLUETOOTH® headset for a mobile phone), or related to the computing device by shared membership in some network consisting of wireless and wired connections between multiple machines (e.g. a printer in an office that prints documents to computers belonging to that office, no matter where they are, so long as they and the printer can connect to the internet). A computing device 100 may be coupled to a second computing device (not shown); for instance, a server may be coupled to a client device, as described below in greater detail.

The communications interface in the system embodiments discussed herein facilitates the coupling of the computing device with data entry devices 109, the device's display 110, and network connections, whether wired or wireless 111. In some embodiments, "data entry devices" 109 are any equipment coupled to a computing device that may be used to enter data into that device. This definition includes, without limitation, keyboards, computer mice, touchscreens, digital cameras, digital video cameras, wireless antennas, Global Positioning System devices, audio input and output devices, gyroscopic orientation sensors, proximity sensors, compasses, scanners, specialized reading devices such as fingerprint or retinal scanners, and any hardware device capable of sensing electromagnetic radiation, electromagnetic fields, gravitational force, electromagnetic force, temperature, vibration, or pressure. A computing device's "manual data entry devices" is the set of all data entry devices coupled to the computing device that permit the user to enter data into the computing device using manual manipulation. Manual entry devices include without limitation keyboards, keypads, touchscreens, track-pads, computer mice, buttons, and other similar components. A computing device may also possess a navigation facility. The computing device's "navigation facility" may be any facility coupled to the computing device that enables the device accurately to calculate the device's location on the surface of the Earth. Navigation facilities can include a receiver configured to communicate with the Global Positioning System or with similar satellite networks, as well as any other system that mobile phones or other devices use to ascertain their location, for example by communicating with cell towers. In some embodiments, a computing device's "display" 109 is a device coupled to the computing device, by means of which the computing device can display images. Display include without limitation monitors, screens, television devices, and projectors.

Computer programs (also called computer control logic) are stored in main memory 103 and/or secondary memory 104. Computer programs may also be received via the communications interface 108. Such computer programs, when executed, enable the processor device 101 to implement the system embodiments discussed below. Accordingly, such computer programs represent controllers of the system. Where embodiments are implemented using software, the software may be stored in a computer program product and loaded into the computing device using a removable storage drive or interface 106, a hard disk drive 105, or a communications interface 108.

Computer program code for carrying out operations of the present invention may be written in an object oriented programming language such as, but not limited to, Java, Smalltalk or C++. However, the computer program code for carrying out operations of the present invention may also be written in conventional procedural programming languages such as the "C" programming language. Computer readable program instructions for carrying out operations of the present invention may also be assembler instructions, instruction-set-architecture (ISA) instructions, machine instructions, machine dependent instructions, microcode, firmware instructions, state-setting data, or either source code or object code written in any combination of one or more programming languages described above. In some instances, the computer readable program can be executed in the reverse order, depending upon the functionality involved. It will also be noted that each block of the flowchart illustrations, and combinations of blocks in the flowchart illustrations, can be implement by special purpose hardware-based systems that perform the specified functions or acts or carry out combinations of special purpose hardware and computer instructions.

The computing device may also store data in database 112 accessible to the device. A database 112 is any structured collection of data. As used herein, databases can include "NoSQL" data stores, which store data in a few key-value structures such as arrays for rapid retrieval using a known set of keys (e.g. array indices). Another possibility is a relational database, which can divide the data stored into fields representing useful categories of data. As a result, a stored data record can be quickly retrieved using any known portion of the data that has been stored in that record by searching within that known datum's category within the database 112, and can be accessed by more complex queries, using languages such as Structured Query Language, which retrieve data based on limiting values passed as parameters and relationships between the data being retrieved. More specialized queries, such as image matching queries, may also be used to search some databases. A database can be created in any digital memory.

Persons skilled in the relevant art will also be aware that while any computing device must necessarily include facilities to perform the functions of a processor 101, a communication infrastructure 102, at least a main memory 103, and usually a communications interface 108, not all devices will necessarily house these facilities separately. For instance, in some forms of computing devices as defined above, processing 101 and memory 103 could be distributed through the same hardware device, as in a neural net, and thus the communications infrastructure 102 could be a property of the configuration of that particular hardware device. Many devices do practice a physical division of tasks as set forth above, however, and practitioners skilled in the art will understand the conceptual separation of tasks as applicable even where physical components are merged.

The computing device 100 may employ one or more security measures to protect the computing device 100 or its data. For instance, the computing device 100 may protect data using a cryptographic system. In one embodiment, a cryptographic system is a system that converts data from a first form, known as "plaintext," which is intelligible when viewed in its intended format, into a second form, known as "cyphertext," which is not intelligible when viewed in the same way. The cyphertext may be unintelligible in any format unless first converted back to plaintext. In one embodiment, the process of converting plaintext into cyphertext is known as "encryption." The encryption process may involve the use of a datum, known as an "encryption key," to alter the plaintext. The cryptographic system may also convert cyphertext back into plaintext, which is a process known as "decryption." The decryption process may involve the use of a datum, known as a "decryption key," to return the cyphertext to its original plaintext form. In embodiments of cryptographic systems that are "symmetric," the decryption key is essentially the same as the encryption key: possession of either key makes it possible to deduce the other key quickly without further secret knowledge. The encryption and decryption keys in symmetric cryptographic systems may be kept secret, and shared only with persons or entities that the user of the cryptographic system wishes to be able to decrypt the cyphertext. One example of a symmetric cryptographic system is the Advanced Encryption Standard ("AES"), which arranges plaintext into matrices and then modifies the matrices through repeated permutations and arithmetic operations with an encryption key.

In embodiments of cryptographic systems that are "asymmetric," either the encryption or decryption key cannot be readily deduced without additional secret knowledge, even given the possession of the corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which the encryption key involves the use of numbers that are products of very large prime numbers, but the decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

Figure 2:
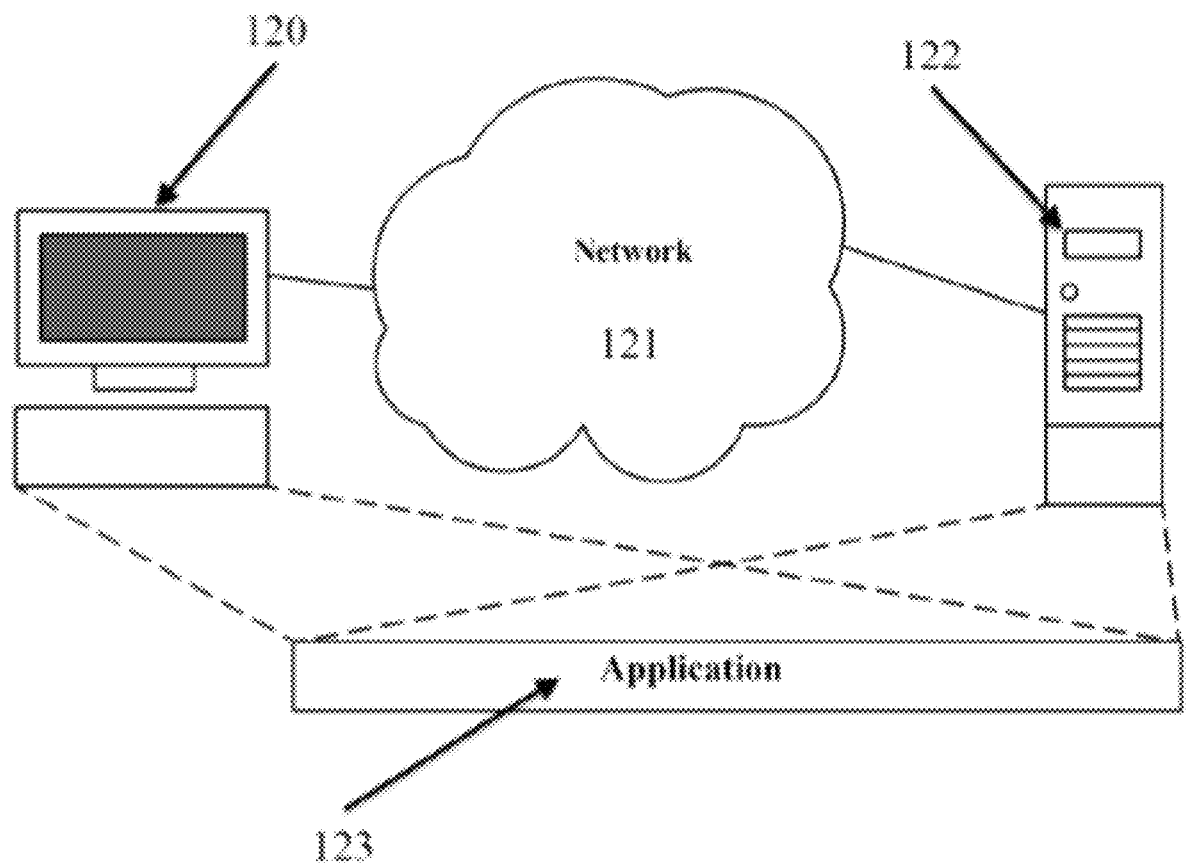
FIG. 2 is a block diagram depicting an example of a network-based platform, as described herein.

The systems may be deployed in a number of ways, including on a stand-alone computing device, a set of computing devices working together in a network, or a web application. Persons of ordinary skill in the art will recognize a web application as a particular kind of computer program system designed to function across a network, such as the Internet. A schematic illustration of a web application platform is provided in FIG. 2. Web application platforms typically include at least one client device 120, which is a computing device as described above. The client device 120 connects via some form of network connection to a network 121, such as the Internet. The network 121 may be any arrangement that links together computing devices 120, 122, and includes without limitation local and international wired networks including telephone, cable, and fiber-optic networks, wireless networks that exchange information using signals of electromagnetic radiation, including cellular communication and data networks, and any combination of those wired and wireless networks. Also connected to the network 121 is at least one server 122, which is also a computing device as described above, or a set of computing devices that communicate with each other and work in concert by local or network connections. Of course, practitioners of ordinary skill in the relevant art will recognize that a web application can, and typically does, run on several servers 122 and a vast and continuously changing population of client devices 120. Computer programs on both the client device 120 and the server 122 configure both devices to perform the functions required of the web application 123. Web applications 123 can be designed so that the bulk of their processing tasks are accomplished by the server 122, as configured to perform those tasks by its web application program, or alternatively by the client device 120. Some web applications 123 are designed so that the client device 120 solely displays content that is sent to it by the server 122, and the server 122 performs all of the processing, business logic, and data storage tasks. Such "thin client" web applications are sometimes referred to as "cloud" applications, because essentially all computing tasks are performed by a set of servers 122 and data centers visible to the client only as a single opaque entity, often represented on diagrams as a cloud.

Many computing devices, as defined herein, come equipped with a specialized program, known as a web browser, which enables them to act as a client device 120 at least for the purposes of receiving and displaying data output by the server 122 without any additional programming. Web browsers can also act as a platform to run so much of a web application as is being performed by the client device 120, and it is a common practice to write the portion of a web application calculated to run on the client device 120 to be operated entirely by a web browser. Such browser-executed programs are referred to herein as "client-side programs," and frequently are loaded onto the browser from the server 122 at the same time as the other content the server 122 sends to the browser. However, it is also possible to write programs that do not run on web browsers but still cause a computing device to operate as a web application client 120. Thus, as a general matter, web applications 123 require some computer program configuration of both the client device (or devices) 120 and the server 122. The computer program that comprises the web application component on either computing device's system FIG. 1 configures that device's processor 200 to perform the portion of the overall web application's functions that the programmer chooses to assign to that device. Persons of ordinary skill in the art will appreciate that the programming tasks assigned to one device may overlap with those assigned to another, in the interests of robustness, flexibility, or performance. Furthermore, although the best known example of a web application as used herein uses the kind of hypertext markup language protocol popularized by the World Wide Web, practitioners of ordinary skill in the art will be aware of other network communication protocols, such as File Transfer Protocol, that also support web applications as defined herein.

The one or more client devices 120 and the one or more servers 122 may communicate using any protocol according to which data may be transmitted from the client 120 to the server 122 and vice versa. As a non-limiting example, the client 120 and server 122 may exchange data using the Internet protocol suite, which includes the transfer control protocol (TCP) and the Internet Protocol (IP), and is sometimes referred to as TCP/IP. In some embodiments, the client and server 122 encrypt data prior to exchanging the data, using a cryptographic system as described above. In one embodiment, the client 120 and server 122 exchange the data using public key cryptography; for instance, the client and the server 122 may each generate a public and private key, exchange public keys, and encrypt the data using each others' public keys while decrypting it using each others' private keys.

In some embodiments, the client 120 authenticates the server 122 or vice-versa using digital certificates. In one embodiment, a digital certificate is a file that conveys information and links the conveyed information to a "certificate authority" that is the issuer of a public key in a public key cryptographic system. The certificate in some embodiments contains data conveying the certificate authority's authorization for the recipient to perform a task. The authorization may be the authorization to access a given datum. The authorization may be the authorization to access a given process. In some embodiments, the certificate may identify the certificate authority.

The linking may be performed by the formation of a digital signature. In one embodiment, a digital signature is an encrypted mathematical representation of a file using the private key of a public key cryptographic system. The signature may be verified by decrypting the encrypted mathematical representation using the corresponding public key and comparing the decrypted representation to a purported match that was not encrypted; if the signature protocol is well-designed and implemented correctly, this means the ability to create the digital signature is equivalent to possession of the private decryption key. Likewise, if the mathematical representation of the file is well-designed and implemented correctly, any alteration of the file will result in a mismatch with the digital signature; the mathematical representation may be produced using an alteration-sensitive, reliably reproducible algorithm, such as a hashing algorithm. A mathematical representation to which the signature may be compared may be included with the signature, for verification purposes; in other embodiments, the algorithm used to produce the mathematical representation is publicly available, permitting the easy reproduction of the mathematical representation corresponding to any file. In some embodiments, a third party known as a certificate authority is available to verify that the possessor of the private key is a particular entity; thus, if the certificate authority may be trusted, and the private key has not been stolen, the ability of an entity to produce a digital signature confirms the identity of the entity, and links the file to the entity in a verifiable way. The digital signature may be incorporated in a digital certificate, which is a document authenticating the entity possessing the private key by authority of the issuing certificate authority and signed with a digital signature created with that private key and a mathematical representation of the remainder of the certificate. In other embodiments, the digital signature is verified by comparing the digital signature to one known to have been created by the entity that purportedly signed the digital signature; for instance, if the public key that decrypts the known signature also decrypts the digital signature, the digital signature may be considered verified. The digital signature may also be used to verify that the file has not been altered since the formation of the digital signature.

The server 122 and client 120 may communicate using a security combining public key encryption, private key encryption, and digital certificates. For instance, the client 120 may authenticate the server 122 using a digital certificate provided by the server 122. The server 122 may authenticate the client 120 using a digital certificate provided by the client 120. After successful authentication, the device that received the digital certificate possesses a public key that corresponds to the private key of the device providing the digital certificate; the device that performed the authentication may then use the public key to convey a secret to the device that issued the certificate. The secret may be used as the basis to set up private key cryptographic communication between the client 120 and the server 122; for instance, the secret may be a private key for a private key cryptographic system. The secret may be a datum from which the private key may be derived. The client 120 and server 122 may then use that private key cryptographic system to exchange information until the secure communication protocol in which they are communicating ends. In some embodiments, this handshake and secure communication protocol is implemented using the secure sockets layer (SSL) protocol. In other embodiments, the protocol is implemented using the transport layer security (TLS) protocol. The server 122 and client 120 may communicate using hyper-text transfer protocol secure (HTTPS).

Figure 3:
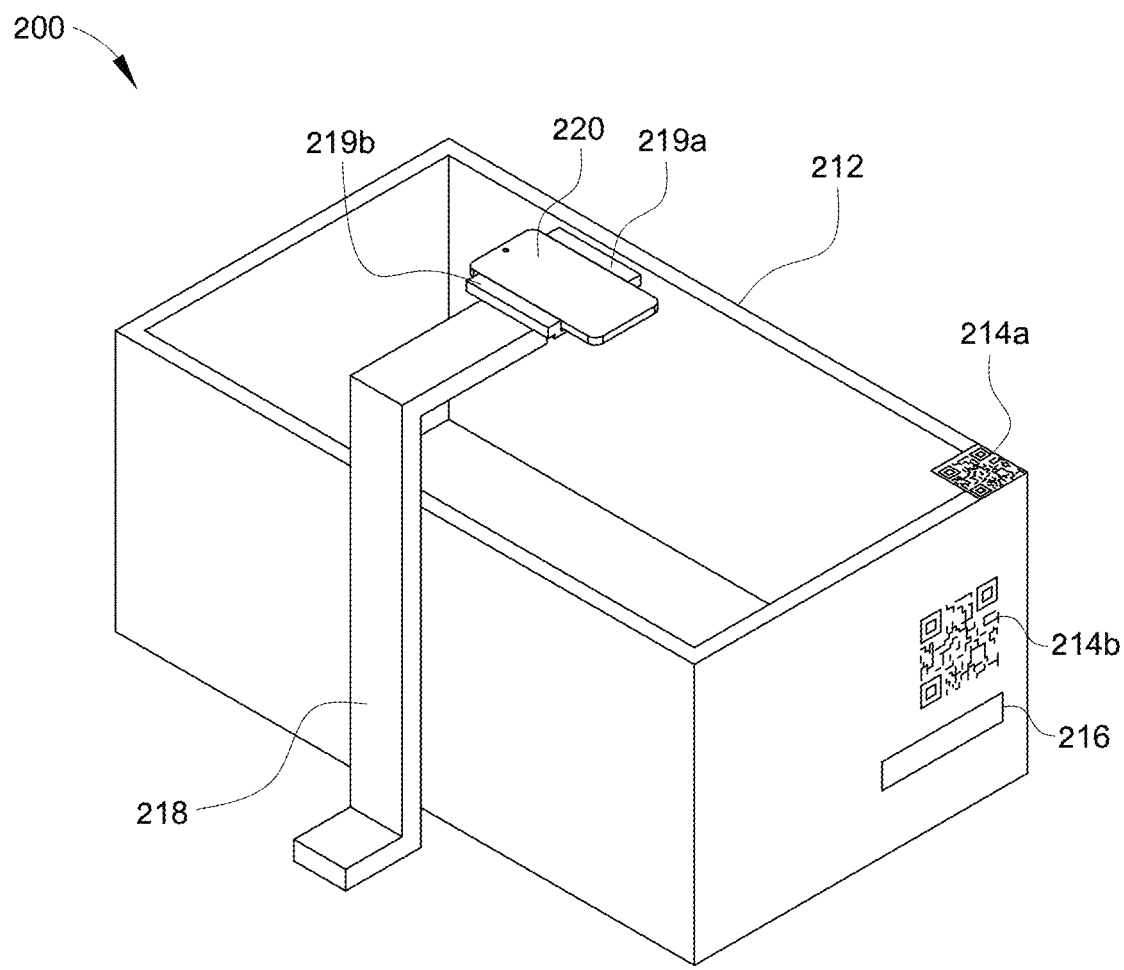
FIG. 3 is a perspective view of the storage container featuring a built-in smartphone stand securely holding a smartphone, in accordance with an embodiment of the present invention.

As described above, the AI-Enhanced Home Storage System encompasses both a physical storage module, and an associated mobile application. The system leverages artificial intelligence (AI) and image recognition technology to streamline the process of item categorization, retrieval, and organization. As illustrated in FIG. 3, the physical storage module 200 includes at least one storage container 212 adapted to store household items. The storage container 212 includes at least one QR-code sticker 214a positioned on top of the storage container 212, which can additionally include at least one QR-code sticker 214b positioned on the side of the storage container 212. Additionally, the storage container 212 can include one or more labels 216 disposed on the side of the storage container 212. The label 216 can contain a serial code of letters/numbers printed thereon for visual identification. In some instances, the serial code can be written over the blank label, if a different name is desired. The QR-code stickers and labels can be permanently attached to the storage container using adhesive, or glue or the like, or in some instances can be detachably attached to the container with Velcro attaching means, for example. In some instances, the storage container can include an NFC reader placed alongside the QR-code sticker to facilitate scanning in the dark. The system also includes computing device stand 218 for securely and releasably holding computing device 220 with a pair of spring-loaded clips 219a and 219b. The computing device 220 can be a smart phone, or a tablet or any other similar device equipped with video and photo cameras, as well as QR-code scanning capabilities. The stand 218 can be permanently attached to the storage container 212 using various attaching means such as glue, adhesive, screws, bolts, nails and the like, or in some instances can be a standalone device. The stand 218 can be of various shapes, such as L-shaped, as illustrated in FIG. 3.

Figure 4:
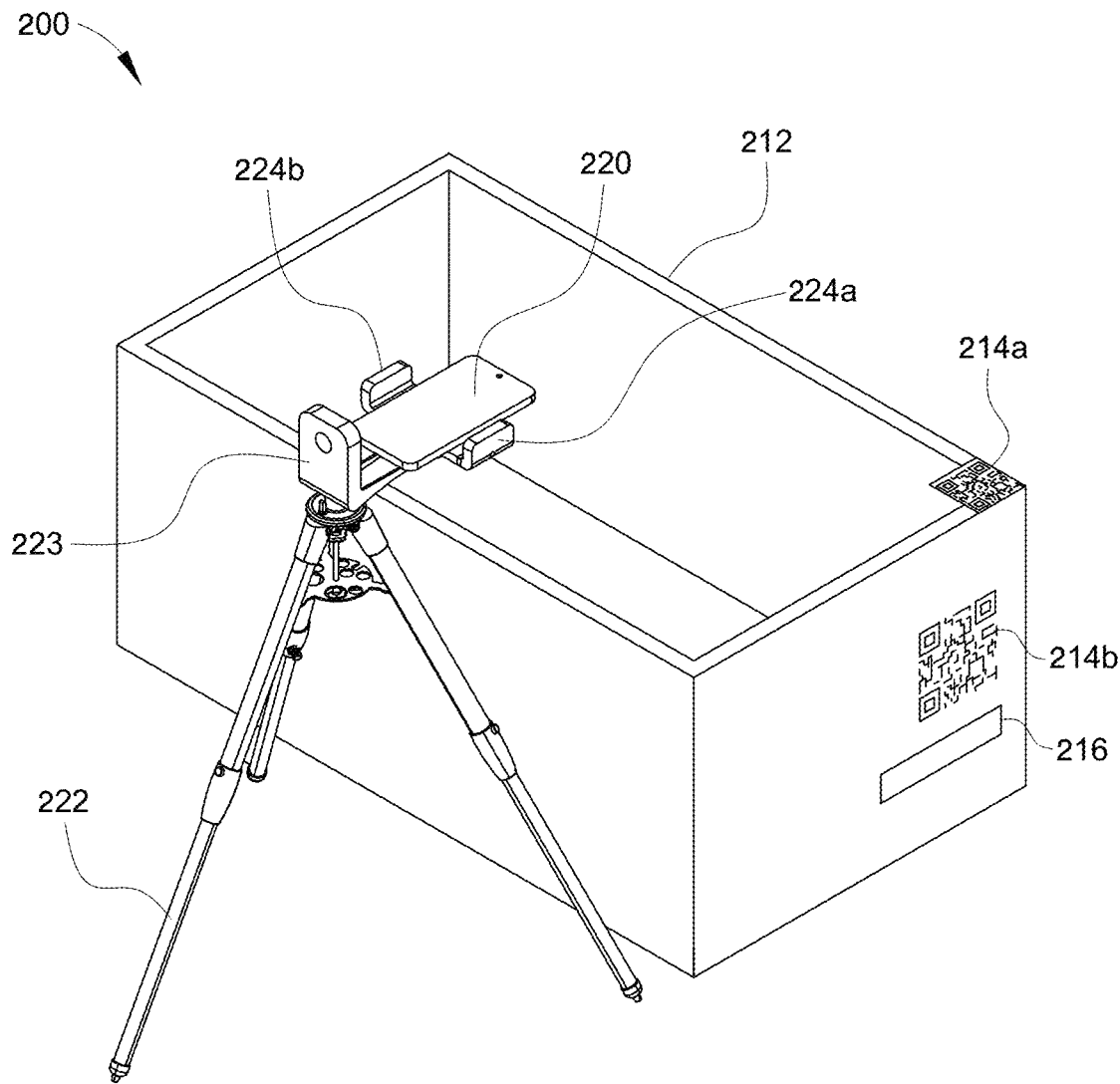
FIG. 4 is a perspective view of the storage container alongside a standalone smartphone stand securely holding a smartphone using a tripod mechanism, in accordance with another embodiment of the present invention.
Figure 5:
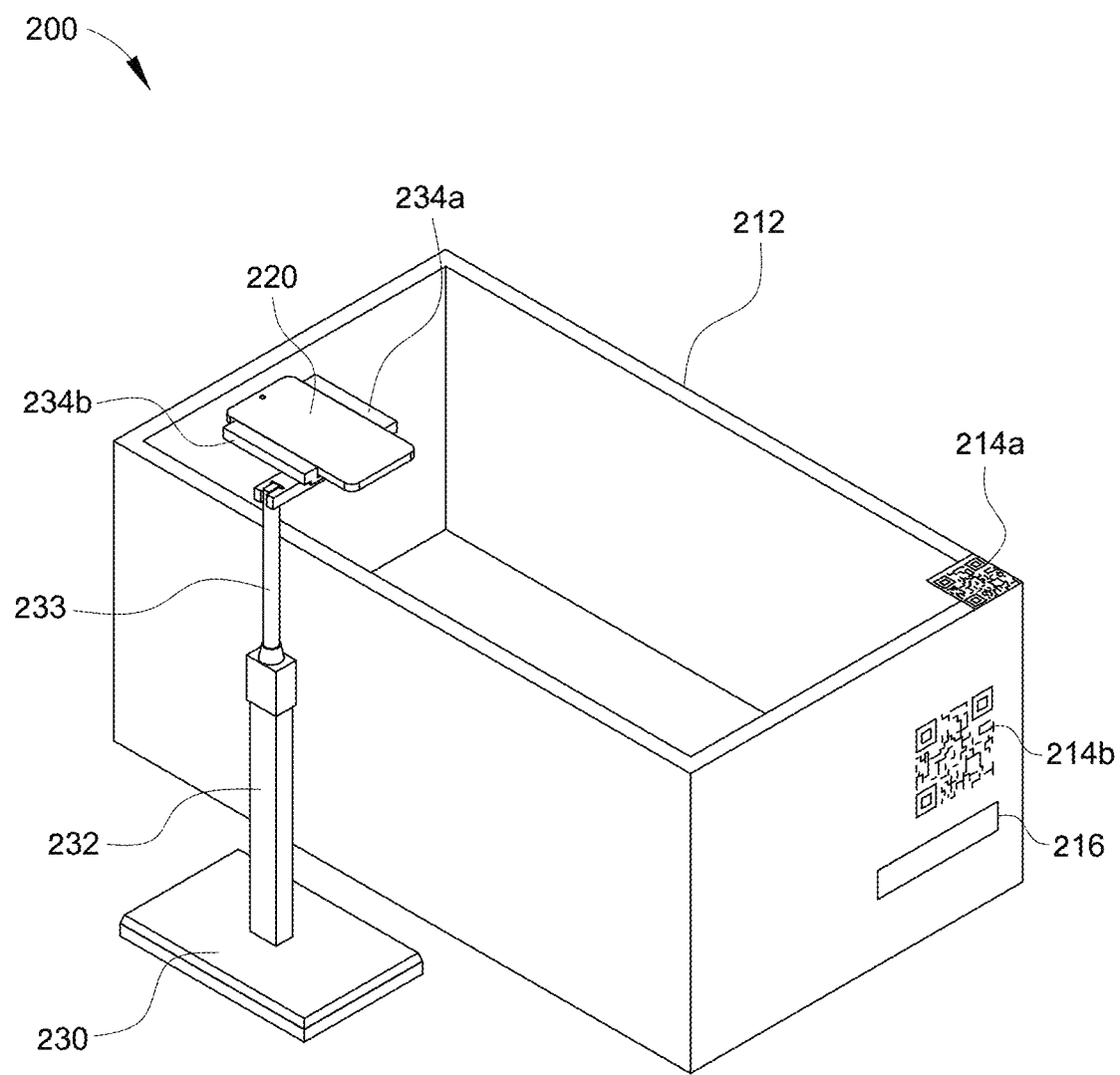
FIG. 5 is a perspective view of the storage container alongside a standalone smartphone stand securely holding a smartphone, in accordance with an embodiment of the present invention.

As shown in FIG. 4, the computing device stand can include computing device holder 223 having a pair of spring-loaded clips 224a and 224b connected to opposing sides of the holder 223 to detachably and securely hold computing device 220, wherein the holder 223 is attached to tripod 222. In some instances, as illustrated in FIG. 5, the computing device stand can include base 230, which is sturdy and wide for stability, ensuring the stand remains firmly planted on a surface, minimizing any risk of tipping over. Rising from the base 230, is a metallic tube 232 for providing vertical support and stability to the stand. The metallic tube 232 is designed to accommodate the retractable member 233 that allows for height adjustment, sliding in and out smoothly, enabling users to modify the stand's height based on their preferences or ergonomic needs. At the top end of the retractable member 233, there is an adjustable holder mechanism featuring a pair of spring-loaded clips 234a and 234b designed to securely grasp the computing device.

Figure 6:
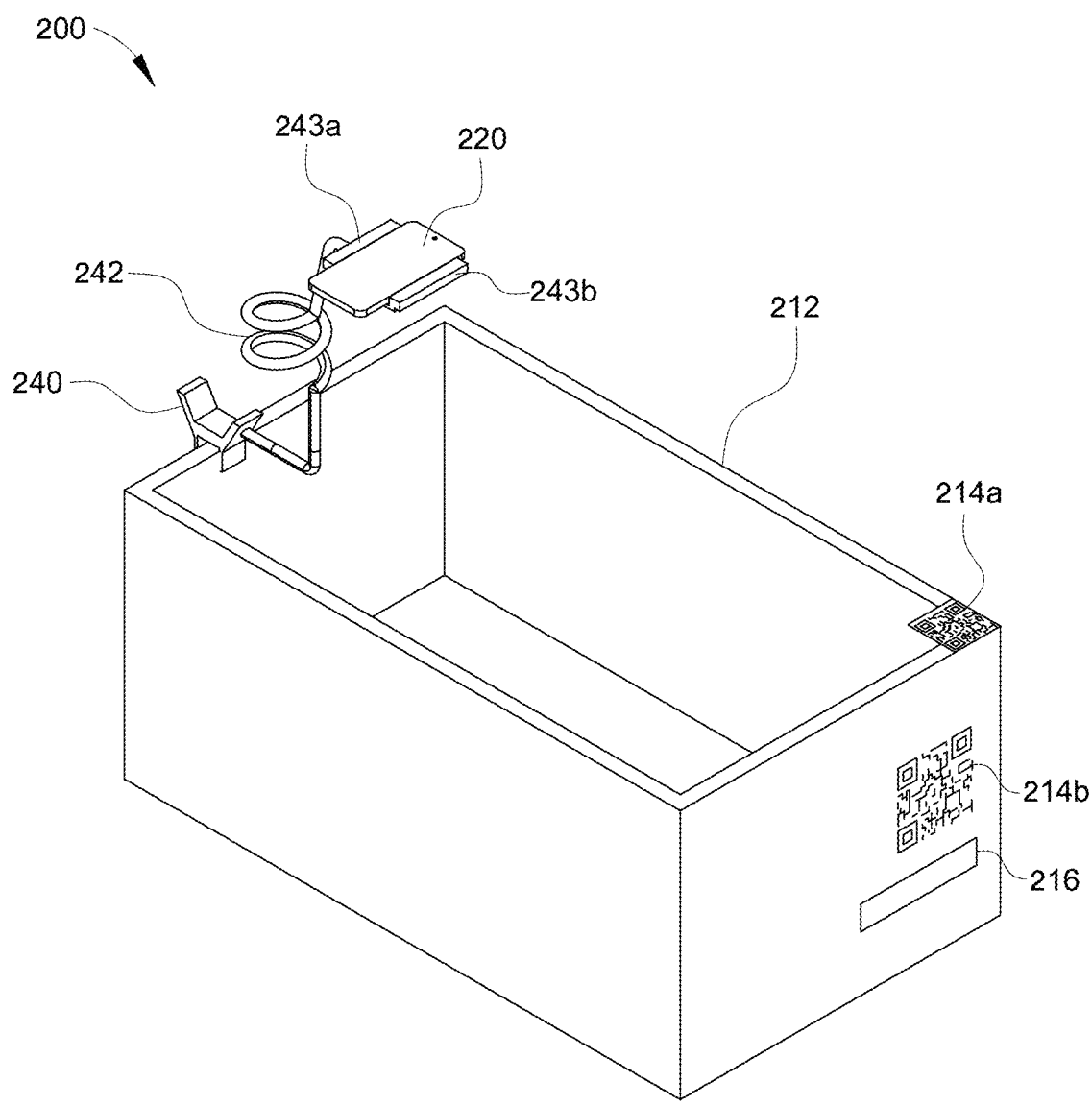
FIG. 6 illustrates a standalone smartphone stand clipped securely onto the edge of the storage container and securely holding a smartphone, in accordance with an embodiment of the present invention.
Figure 7:
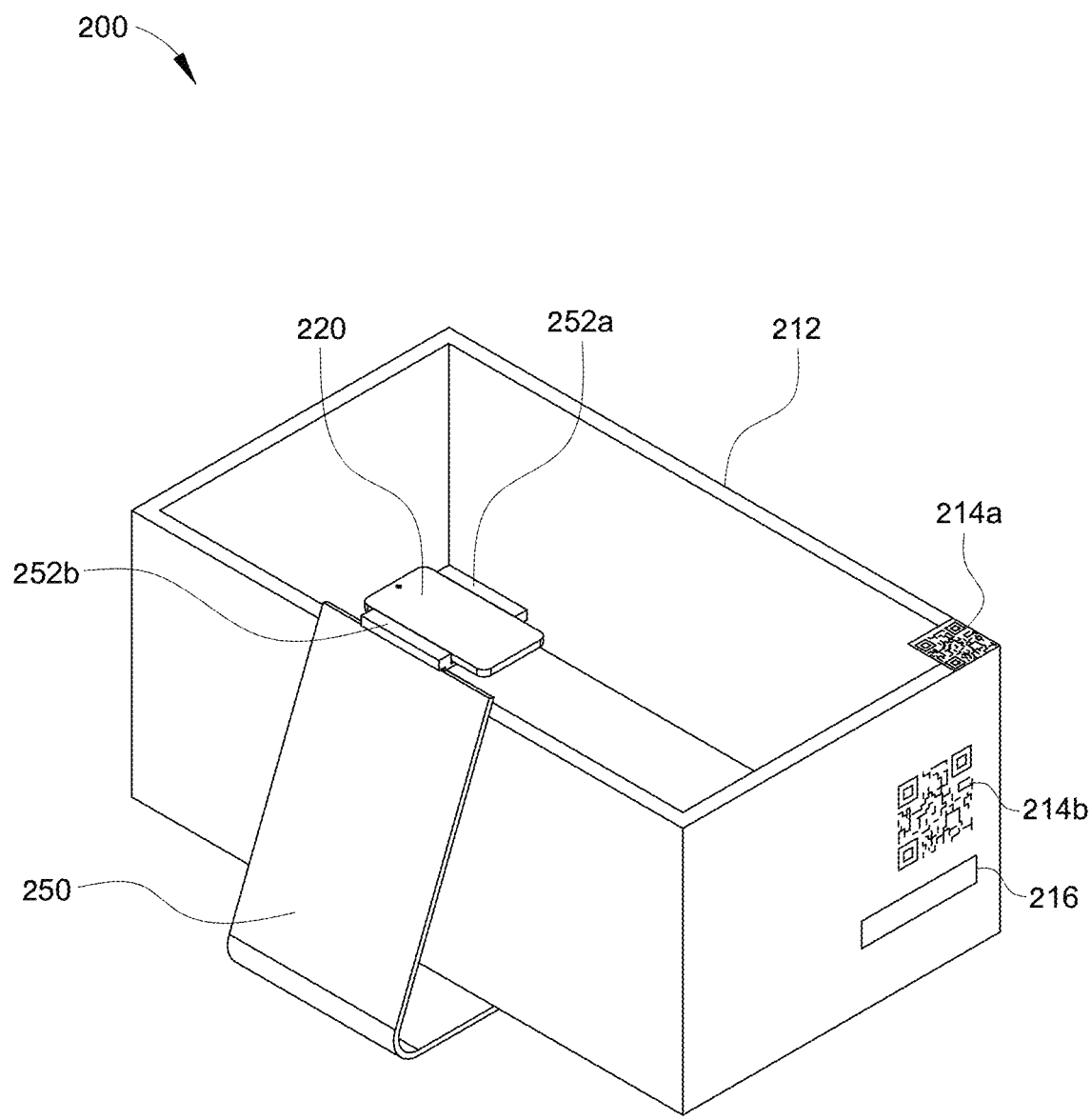
FIG. 7 illustrates an L-shaped, standalone smartphone stand securely holding a smart phone, in accordance with another embodiment of the present invention.

According to some embodiments of the present invention, the computing device stand can include clamp 240 coupled to the adjustable tubing 242 which terminates in the computing device holder that includes a pair of spring-loaded clips 243a and 243b disposed on opposing sides of the holder. The stand is releasably attached to one of the sides of the storage container 212 by means of clamp 240, as shown in FIG. 6, for example. In some instances, the computing device stand 250 can be L-shaped as shown in FIG. 7. It will be understood by a person skilled in the art that other attaching means can be employed to releasably and securely hold a computing device such as a smart phone or the like. For example, the stand can include a computing device holder that is designed to hold the computing device magnetically. In some instances, the stand can include a computing device holder that is shaped to releasably hold the computing device. Like computing device stands, the storage containers can be of various shapes, such as a cube, a rectangular prism, or any other suitable geometric form.

According to the embodiments of the present invention, each storage container will have a unique QR code affixed to it. This QR code will contain an assigned number and letter combination that serves as an identifier for that container. Additionally, this QR code can contain encoded information about the container's location, such as a specific room in a house or apartment (e.g., living room or office), GPS coordinates, or a specific address. Using a smartphone equipped with a QR code scanner application, a user can scan the QR code affixed to the storage container. Upon scanning, the smartphone will retrieve the encoded information embedded in the QR code. Once the QR code is scanned, the smartphone application of the present invention initiates a recording process, or alternatively, it can be initiated by a user. The person can start loading household items into the container, and as items are added, the smartphone application captures the process through video, photos or a checklist system. The application on the smartphone records the items being loaded into the container. This could include like the type of items, quantity, and photos and/or videos for visual reference. The data is stored in the app's database, associating the recorded information with the specific container's identifier (the number and letter combination from the QR code). After the loading process is completed and recorded, the smartphone app stores this information for future reference. Later on, if the person needs to retrieve a specific item, they can use the app to search for it. The app will remind the person which items are stored in which container by referencing the recorded data associated with each container's unique identifier. This system allows for easy retrieval of stored items by providing a digital record of their locations within the containers. Users can access this information anytime through the smartphone app, eliminating the need for manual searching through multiple containers. The system can include two QR codes, at the top and on the side of the container for the camera and the person to scan. Both QR codes are the same (contain the same information) but placed in difference places on the container for convenience of scanning. Additionally, the labels placed on the sides of the storage container can include a serial code of letters/numbers printed on the label for visual identification, it can be printed, or written over with included blank labels, if a different name or other information is desired.

As mentioned above, in some instances, the storage container can include an NFC (Near Field Communication) reader placed alongside the QR-code sticker to facilitate scanning in the low-light or dark conditions, offering a convenient alternative for accessing information about the container. When a person needs to access information about the container's contents or record additional items in low-light conditions, they can simply tap their NFC-enabled smartphone against the NFC reader located on the container. This action triggers the smartphone to interact with the NFC reader, instantly accessing the stored data related to that specific container. While the QR code remains the primary method for scanning and recording, the NFC reader provides an additional, convenient means of interaction, particularly beneficial in low-light scenarios.

The innovative system of this invention automates the process of recording, identifying, and cataloging items effortlessly as they are placed into storage. It operates seamlessly by utilizing a smartphone camera to capture and document items in real-time, ensuring a streamlined and organized storage experience. Upon initiating the system through the accompanying mobile app, the smartphone camera serves as an intelligent recording tool. Items placed in clear and unobstructed view of the camera, whether within a storage container or at the storage location, are automatically identified and cataloged by the app.

Setting up the system is hassle-free. Users can place their smartphone on a designated stand facing the container's interior or the storage space before loading items. Starting the recording process via the app initiates the system to actively recognize and document items as they're introduced into the storage area. Should an item not register or be properly documented by the app during the loading process, the system prompts the user with an audible alert. The app provides visual guidance, signaling that the item requires proper recording. To rectify this, the user simply holds and turns the item in clear view of the camera to facilitate accurate documentation for better detail, such as front and back of a shirt, for example.

Although the system of this invention excels in automatically categorizing items, offering a hands-free approach to inventory management, it also grants users the flexibility to manually input each item as a backup option. This functionality allows users to input specific item details manually into the system as a backup, ensuring comprehensive item documentation even in scenarios where automated categorization may not be feasible. In situations where the automatic categorization may face challenges, such as obscured views or uncommon items, the manual input capability serves as a reliable backup. Users can enter item details directly into the system through the app, ensuring accurate and complete inventory records.

The system of the present invention also includes an AI-powered chatbot, which is configured to assist in locating specific items based on the item description provided by the user. The system is designed to seamlessly interpret and respond to conversational prompts, facilitating an intuitive and human-like interaction. Once the AI identifies the requested items based on the user's description, it initiates a search within the storage system to locate the exact placement of those items. The chosen place of storage is swiftly identified, ensuring a prompt and accurate retrieval process. The AI chatbot engages users in a natural conversational flow, allowing them to articulate their search queries as if conversing with a person. Upon identifying the desired items from the images, the AI not only pinpoints their location within the storage area but also provides contextual information regarding their placement. This intuitive mapping simplifies the retrieval process, ensuring efficient access to stored items. The AI module of the present invention is adaptive and responsive for it continually learns from user interactions, adapting its responses to improve accuracy and efficiency in locating items based on user's inputs. Its responsiveness and adaptability enhance the overall user experience, making each interaction more effective and personalized.

The app encompasses a range of innovative features tailored to enhance the user experience within the storage system. These functionalities include virtual rummaging through stored items, customizable item descriptions, and a versatile attribute assignment capability in a multi-user environment.

Virtual Rummaging Experience. Users can indulge in a virtual rummaging experience, granting them the ability to explore the contents of specific storage sections or containers without physically sifting through them. Through the app's interface, they can request a visual display of all items stored within a designated section, conveniently accessed and viewed on their smartphone screen.

Customizable Item Descriptions. Furthermore, the app enables users to modify and personalize item descriptions according to their preferences. This customization capability allows for detailed and tailored item descriptions, facilitating better organization and providing additional information about stored belongings.

Individual Item Attribution in Multi-Person System. In multi-user environments, the app supports the attribution of specific items to individuals. Users within the system can assign ownership or responsibility for particular items, streamlining accountability and tracking of belongings within a shared storage setup. According to some embodiments of the present invention, the app's user interface fosters collaboration by accommodating multiple users within the storage system. Its intuitive design facilitates seamless communication and interaction among users, allowing for effortless navigation and efficient utilization of its diverse features.

Through continuous interactions and data analysis, the machine learning algorithms embedded in the system intelligently discern user preferences. By comprehensively analyzing user behaviors, stored item preferences, and usage patterns, the system refines its recommendations and functionalities to better align with individual need (e.g., the user have many orange hats but never wears them with green clothing).

The system offers the option to seamlessly sync calendars, reminders, and locational weather data, enabling it to provide contextual suggestions based on shared information. Leveraging this synced data, the system intelligently suggests relevant items or reminders, considering upcoming events, weather conditions, or location-based needs.

Users benefit from task-driven and interest-based item suggestions. By understanding requested tasks or identified interests, the system actively recommends relevant items, ensuring a more intuitive and efficient retrieval process. Whether it's for a specific task or a hobby, the system provides tailored suggestions for easy access to required belongings (e.g., appropriate clothing for mountain hiking).

The app supports individual user profiles accessible on a single smartphone. These profiles remember specific preferences, stored items, and personalized settings for each user within the storage system. This personalized approach ensures a tailored experience for each user interacting with the app.

Users can attribute smart containers to designated areas within the home, storage units, or various locations where possessions are kept. These containers are intelligently associated with specific areas, streamlining item storage and retrieval by offering quick identification of where particular items are located.

The app incorporates a comprehensive location tracking system that enhances item management within the storage environment. It offers notifications prompting users to update the status of stored items, allowing them to indicate whether an item has been (i) placed back in its original location, (ii) moved to a different storage spot, or (iii) removed entirely from the AI's network. Users have the option to customize their tracking preferences, including the ability to record the history of item movements. This optional feature enables the recording of details such as: date and time of an item's check-out or movement, purpose or reason for the item's usage or relocation, and identification of the user who requested the item. This system operates seamlessly within the app, ensuring efficient item management without physical alterations to the storage setup.

The app features seamless integration with smart home devices, facilitating effortless interaction and enhancing user accessibility to locate stored items. Users can engage in natural conversation with smart home speakers, employing conversational prompts to inquire about the locations of specific items stored within the system. This integration allows users to interact in a fully natural manner, akin to asking another person about the whereabouts of items within their home. Through voice commands directed at smart home speakers, users can inquire about the locations of items using simple and natural language. For instance, they can ask where their winter coats are stored or the whereabouts of a specific tool, enabling intuitive and conversational interactions.

The system prioritizes user privacy and data security through robust encryption protocols. All stored information remains encrypted and is exclusively stored locally on the user's device or on the server. This stringent security measure ensures that sensitive data, including item details and personal information, remains safeguarded against unauthorized access or breaches. Users have granular control over permissions and access levels within the shared networks. They can manage permissions to specific items or categories, granting or revoking access as needed. This enables users to maintain a balance between collaboration and privacy, ensuring that shared information remains controlled and secure.

According to some embodiments of the present invention, the system is designed to securely send and retrieve encrypted information to and from the server by employing robust encryption, secure communication protocols, access controls, and secure storage practices, as described in detail above. This comprehensive approach ensures that sensitive data remains protected and confidential throughout transmission and storage. Before transmitting any information from the app to the server or vice versa, the data is encrypted using robust encryption protocols. This encryption converts the data into a secure, unreadable format using algorithms and keys, rendering it unintelligible to unauthorized parties. Encrypted data is securely transmitted between the app and the server using secure communication protocols such as HTTPS (Hypertext Transfer Protocol Secure). This protocol encrypts data during transit, safeguarding it from interception or eavesdropping by malicious actors. Access to the server is controlled through authentication and authorization mechanisms. Users must provide valid credentials (authentication) to access the server, and their access privileges (authorization) are defined based on their roles or permissions within the system. Encrypted information received from the app is stored in encrypted form on the server's database or storage systems. This ensures that even if the data is accessed without authorization, it remains unintelligible without the appropriate decryption keys. When authorized users or the app request information from the server, the encrypted data is retrieved and decrypted using authorized keys or credentials. Only users with the necessary permissions and access rights can decrypt and view the sensitive information. The encryption process ensures end-to-end security, meaning data remains encrypted throughout its entire journey—from the app to the server and back. This approach ensures that sensitive information is protected not only during transmission but also during storage on the server.

The system of the present invention also utilizes blockchain integration for enhanced security. The system leverages blockchain technology to fortify its security infrastructure. Blockchain's decentralized and immutable ledger system adds an extra layer of security to user data. Transactional records related to item movements, access permissions, and shared information are cryptographically secured within the blockchain, enhancing data integrity and transparency.

The system of the present invention can be used as a standalone application utilizing existing furniture without the use of specially made storage containers. The innovative application introduced in this invention adapts seamlessly to existing furniture pieces like closets, drawers, or storage boxes, offering an effortless process for item cataloging. Users initiate the application, designating the location of the existing storage within their living room, bedroom, attic, or other spaces. Placing the smartphone on a stand facing the designated storage area allows for an unobstructed view of items being placed inside. As users load items into the existing storage, the smartphone captures the process, providing an option to display additional views such as the front and back of household items. In some instances, a set of QR code stickers and labels can be provided to be attached to the existing furniture pieces.

Figure 8:
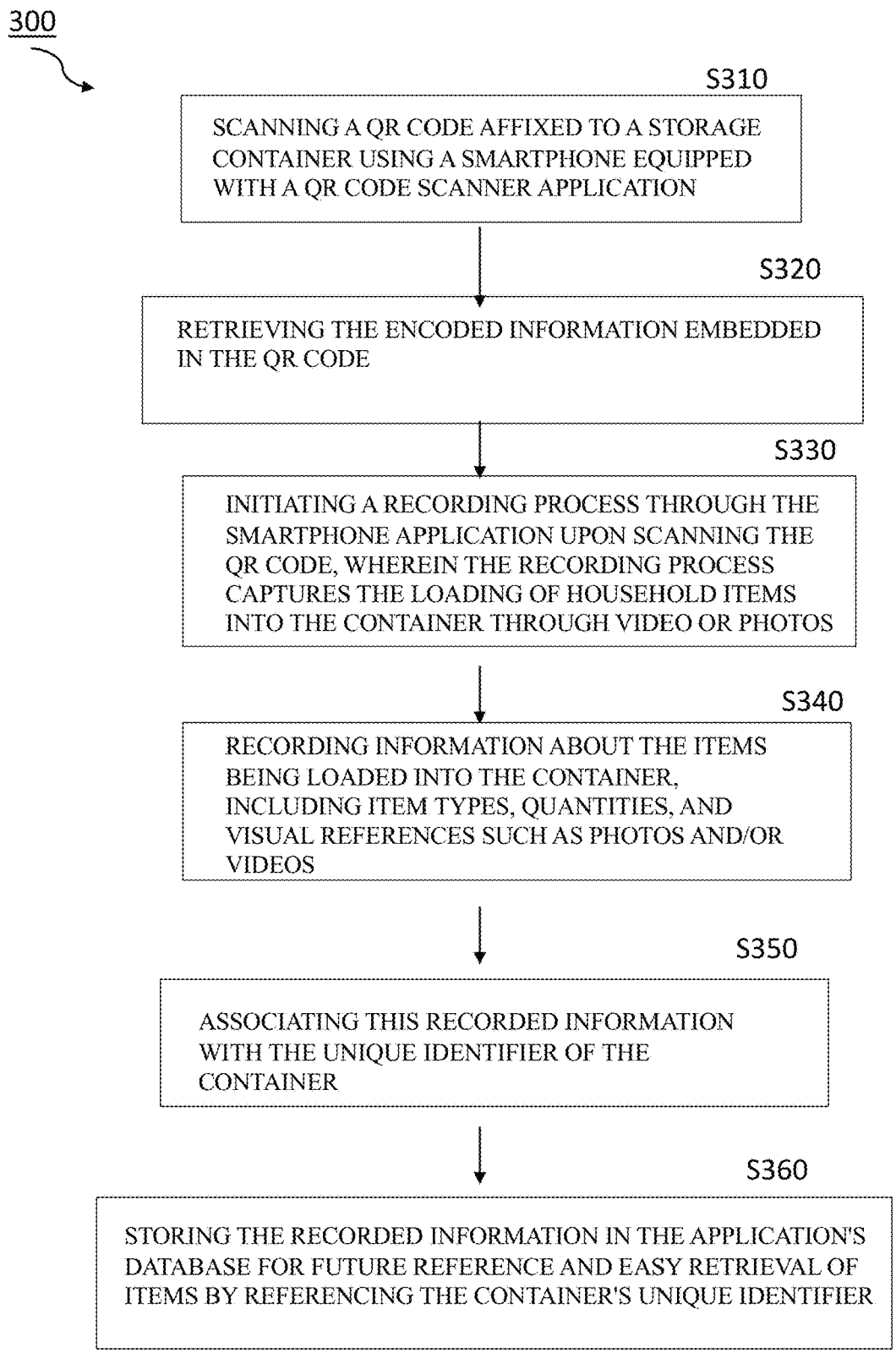
FIG. 8 is a flow diagram illustrating the method of using the system for streamlining the process of item categorization, retrieval, and organization in accordance with an embodiment of the present invention.

As illustrated in FIG. 8, the method 300 for streamlining the process of item categorization, retrieval, and organization during storage of items in one or more storage containers using a smartphone and an associated application includes the steps of scanning a QR code affixed to a storage container using a smartphone equipped with a QR code scanner application (step 310), retrieving the encoded information embedded in the QR code (step 320), initiating a recording process through the smartphone application upon scanning the QR code, wherein the recording process captures the loading of household items into the container through video or photos (step 330), recording information about the items being loaded into the container, including item types, quantities, and visual references such as photos and/or videos (step 340), associating this recorded information with the unique identifier of the container (step 350), and storing the recorded information in the application's database for future reference and easy retrieval of items by referencing the container's unique identifier (step 360).

The system of the present invention leverages advanced algorithms to identify the digital ID of an item, container, or tagged section based on its current location within a designated space, as viewed through the smartphone's camera within the app. This innovative feature enables users to seamlessly categorize and organize items within their living spaces, even accounting for minor variations in furniture arrangement or layout changes. The app's sophisticated understanding of spatial dynamics ensures consistent recognition and cataloging, regardless of slight modifications to the environment.

When cataloging items in open areas within a room, users are prompted to point out items for identification. These open areas are initially recognized as unnamed rooms or pathways, potentially containing recognized items. While the app may suggest the type of area based on contextual clues, such as furniture arrangement or spatial configuration, it ultimately defers to user input for naming and categorization. This user-centric approach allows for personalized and intuitive labeling of spaces within the room, enhancing the overall organization and usability of the application for users in diverse living environments.

The system of the present invention is configured to comprehend the interior layout of a space, replicating the human-like perception of connectivity from room to room or level to level through detailed video analysis. By processing extensive visual data, the app develops a profound understanding of spatial relationships within the environment. This holistic approach to spatial awareness significantly enhances item tracking precision, as the app effectively maps out the entirety of the user's living space, taking into account intricate details and nuances. The more comprehensive the captured information, the greater the app's understanding, resulting in heightened accuracy in locating and tracking items throughout the designated area. This advanced feature revolutionizes the way users interact with their surroundings, offering unparalleled convenience and efficiency in item management within their homes.

The system of the present invention includes a novel feature that transforms users' smartphones into a secondary visual guide, providing notifications based on potential item identifications during searches, akin to having an additional set of eyes on the task at hand. This functionality, designed with user convenience in mind, offers a unique approach to item retrieval, particularly beneficial for individuals seeking enhanced assistance. By leveraging the system, users can engage more deeply with the application, enhancing their overall experience. Users have the flexibility to hold their smartphones as they move around or sift through belongings. If the app detects a potential match for the item being sought, it promptly notifies the user, offering real-time assistance and streamlining the search process. This intuitive feature not only saves time but also promotes a sense of collaboration between the user and the application, reinforcing the system's commitment to delivering user-centric solutions for efficient and effortless item management.

According to another embodiment of the present invention, the system is configured to encompass the tailored handling of cardboard moving boxes within the system, distinguishing them from permanent storage solutions. With this addition, the system gains the capability to classify cardboard moving boxes separately, acknowledging their temporary nature and unique storage characteristics. This specialized functionality ensures optimized management of items stored within cardboard moving boxes, enhancing the overall efficiency and adaptability of the system of the present invention to various storage scenarios.

The storage system of the present invention is further configured to comprehend the relationships between items. For instance, the system can discern the context of items within containers or enclosures, recognizing how they relate to each other. For example, when presented with a case containing sunglasses, the system can recognize the presence of sunglasses within the case and understand the relationship between them. Moreover, if the user removes the sunglasses from the case and subsequently returns them, the system maintains an understanding of this relationship. This advanced functionality enables the storage system to interpret the spatial and contextual dynamics of items within containers, fostering a more intuitive and comprehensive approach to item management.

The system of the present invention also includes a powerful item lookup feature, empowering users to streamline their decision-making process and enhance their overall experience. For instance, users can utilize the item lookup ("Do I have something like this?") feature to scan items and determine if they already own something similar before making a new purchase. This functionality not only aids in avoiding duplicate purchases but also promotes sustainable consumption practices.

In scenarios where users seek specific items but are unable to recall details such as the title of a book or the name of a particular item, the application offers robust search functionalities. For example, users can describe the desired item, providing details such as content, cover details, or specific characteristics, and the app will search its database to identify relevant matches from their own inventory. This capability extends beyond books to include magazines, DVDs, and more, ensuring users can easily locate desired items even when lacking specific information.

Additionally, the application's item lookup abilities extend to practical scenarios such as managing dietary restrictions or allergies. For instance, users hosting guests with food allergies can inform the application about the allergies, and it will cross-reference previous scans or conduct live updates using the smartphone camera to identify suitable food items. The app analyzes ingredient lists and processing warnings to provide tailored recommendations, allowing users to make informed decisions and accommodate dietary preferences with ease.

Furthermore, the application goes beyond simple item lookup by suggesting culinary creations based on the ingredients users already have on hand. By analyzing the available food items, the app offers creative recipe suggestions, enabling users to make the most of their existing pantry supplies and inspiring culinary adventures.

In accordance with some embodiments of the present invention, branded items featuring specific Near Field Communication (NFC) programming can be designed for seamless integration with the storage system of the present invention. This innovative use of NFC technology enhances the overall functionality and appeal of the AI-based storage system, offering users a unique and interactive experience with branded products. While some items may feature embedded NFCs, others will be coded with improved functionality, ensuring a consistent and enhanced user experience across the board. This initiative highlights the versatility of the system's existing QR/NFC technology, demonstrating its adaptability to various products and environments.

The system of the present invention enhances user engagement and experience by integrating Augmented Reality (AR) overlays into its visual component. This innovative feature overlays digital information, graphics, or interactive elements onto the real-world view captured by the smartphone camera, providing users with contextual and actionable insights. Whether users are cataloging items, navigating storage spaces, or searching for specific belongings, AR overlays offer intuitive visual cues and supplementary information, enriching the overall interaction with the app. This integration of AR technology elevates the app's functionality, enabling users to seamlessly blend digital content with their physical surroundings for enhanced convenience and effectiveness.

For example, in a scenario where a user utilizes the app for cataloging kitchen items, as the smartphone camera is pointed towards a designated storage area, AR overlays appear on the screen, highlighting different sections of the kitchen such as cabinets, drawers, and shelves. These overlays provide visual cues to help the user navigate through the storage space more efficiently. As the user focuses on a particular cabinet, the AR overlay displays virtual labels or icons representing the items stored inside. For example, labels indicating "plates," "glasses," and "pots and pans" appear overlaid on the cabinet doors, making it easy for the user to identify the contents without physically opening each cabinet. Additionally, when the user selects a specific item, such as a coffee mug, the AR overlay provides additional information or options. For instance, virtual buttons may appear allowing the user to view related items, such as matching saucers or lids, or access relevant recipes or usage tips. In this way, the AR overlays enhance the app's visual component by providing intuitive guidance and actionable information, ultimately improving the user's experience and efficiency in managing their belongings.

[clip on NFC tags] In some instances, the system of the present invention can utilize clip-on NFC tags designed for non-visual scans of certain private items within the system, offering users enhanced convenience and privacy. These NFC tags enable users to interact with designated items without the need to open the camera, streamlining the scanning process and ensuring a seamless user experience. It's important to note that this functionality specifically pertains to the interaction of NFC tags within the storage system of the present invention, providing users with a discreet and efficient means of accessing information or performing actions related to their stored items.

In accordance with some embodiments of the present invention, the NFC tags integrated within the storage system offer dynamic information display capabilities, adapting their output based on the identity of the user scanning them. This feature ensures privacy and security while enabling personalized interactions with stored items. When scanned by the rightful owner, the NFC tag reveals detailed information about the items stored within, providing convenient access to inventory details, item descriptions, and related data. In contrast, if scanned by a stranger or a user with limited access permissions, the NFC tag displays restricted information, such as contact details or generic identifiers, safeguarding the owner's privacy and preventing unauthorized access to sensitive information.

The following is an example implementation of the NFC tag dynamic information display feature of the present invention, involving a luggage tag equipped with an NFC tag. When scanned by the owner using their smartphone, the NFC tag instantly displays a comprehensive list of the contents stored within the luggage, including clothing items, toiletries, and electronic devices. This enables the owner to quickly verify the contents of their luggage without the need to open it. However, if the luggage tag is scanned by a stranger or an unrecognized user, the NFC tag presents limited information, such as the owner's contact information or a unique identifier linked to the luggage. This ensures that only authorized individuals can access detailed information about the luggage's contents, maintaining the owner's privacy and enhancing security within the storage system.

In an effort to make the system of the present invention more accessible and user-friendly for individuals with diverse needs and abilities, AI-driven enhancements are being introduced to ensure usability for everyone. Recognizing that users may have varying levels of dexterity, mobility, or visual capabilities, the goal is to provide a seamless experience that accommodates these differences. For individuals with different levels of dexterity or hand mobility, AI algorithms optimize the interaction process, allowing for alternative input methods such as voice commands, gestures, or customized controls tailored to individual preferences. This ensures that users can effectively navigate the app and interact with its features regardless of their physical limitations.

Moreover, the system of the present invention is configured to address the needs of users with visual impairments or color blindness by implementing AI-driven accessibility features. These features may include voice-guided navigation, text-to-speech capabilities, high-contrast interfaces, and customizable color schemes to improve readability and usability for users with visual impairments. Additionally, AI algorithms can analyze images and provide audio descriptions of items, enabling users to identify and manage their belongings more effectively.

In accordance with some embodiments of the present invention, the system includes the following features. Voice Commands: Users can interact with the app using voice commands to navigate menus, scan items, or perform actions. Gesture Controls: Gesture recognition technology allows users to control the app through simple hand movements or gestures, providing an alternative input method for individuals with limited hand mobility. Text-to-Speech: The app features text-to-speech functionality that reads out menu options, item descriptions, or notifications for users with visual impairments. High-Contrast Mode: Users can toggle a high-contrast mode within the app to improve readability and visibility for individuals with low vision or color blindness. Image Recognition: AI algorithms analyze images captured by the smartphone camera and provide audio descriptions of items, helping users identify and categorize their belongings. Hence, by leveraging AI technology to enhance accessibility, the system of the present invention creates a more inclusive and user-centric experience for all individuals, regardless of their abilities or limitations.

Terms and phrases used in this document, and variations thereof, unless otherwise expressly stated, should be construed as open-ended as opposed to limiting. As examples of the foregoing: the term "including" should be read as mean "including, without limitation" or the like; the term "example" is used to provide exemplary instances of the item in the discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount, or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the subject matter of the present invention. For example, the term "about," when referring to a value can be meant to encompass variations of, in some embodiments±100%, in some embodiments±50%, in some embodiments±20%, in some embodiments±10%, in some embodiments±5%, in some embodiments±1%, in some embodiments±0.5%, and in some embodiments±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

The foregoing detailed description is merely exemplary in nature and is not intended to limit the invention or application and uses of the invention. Furthermore, there is no intention to be bound by any expressed or implied theory presented in the preceding technical field, background, brief summary, or the following detailed description.

What is claimed is:

1. A method for streamlining the process of item categorization, retrieval, and organization during storage of items in one or more storage containers using a computing device equipped with a camera and an associated application, said method comprising:
   capturing visual data of a designated space using the camera of the computing device, wherein the capturing is guided by prompts from the application to ensure proper alignment and comprehensive data acquisition;
   processing the captured visual data with advanced algorithms, wherein the algorithms are configured to identify digital identifications (IDs) of items, containers, or tagged sections based on their spatial relationships and contextual clues derived from furniture arrangement within the designated space;
   categorizing and organizing the identified items, containers, or tagged sections within a virtual representation of the designated space, wherein the virtual representation is dynamically updated to account for variations in furniture arrangement or layout changes;
   enabling user interaction for naming and categorization of unnamed rooms, pathways, or tagged sections within the designated space, wherein the categorization integrates user-defined inputs with contextual clues generated by the algorithms; and
   storing the categorized data and virtual representation in a database, wherein the stored data enables user retrieval, real-time updates, and enhanced inventory management.

2. The method of claim 1, wherein the advanced algorithms are configured to recognize and suggest the type of area within the designated space based on contextual clues, with the final categorization deferred to user input.

3. The method of claim 1, further comprising providing notifications to the user based on potential item identifications during searches, effectively acting as a secondary visual guide for enhancing item retrieval.

4. The method of claim 1, wherein the system is further configured to distinguish between permanent storage solutions and temporary storage means, such as cardboard moving boxes, and to classify them accordingly within the application.

5. The method of claim 1, wherein the system comprehends relationships between items within containers or enclosures, allowing for a dynamic understanding of the context and spatial dynamics of these items.

6. The method of claim 1, further including the capability to maintain an understanding of the relationship between items and their containers or enclosures, even after the items have been removed and subsequently returned.

7. The method of claim 3, wherein the notifications are provided in real-time, assisting the user in locating items within the designated space by leveraging the processed visual data and identified digital identifications (IDs).

8. The method of claim 4, wherein the tailored handling of cardboard moving boxes includes recognizing their temporary nature and unique storage characteristics, thereby optimizing the management of items stored within.

9. The method of claim 1, wherein the process of capturing visual data includes the use of a smartphone camera within the application, enabling the user to seamlessly interact with the system by moving around the designated space.

10. The method of claim 1, further comprising:
    utilizing detailed video analysis to capture and construct a digital model of the designated space, including dimensions, furniture placement, and potential storage areas;
    applying machine learning algorithms to interpret the captured video data, thereby identifying and understanding the spatial relationships and connectivity between different areas within the designated space;
    dynamically updating the digital model in response to changes within the designated space, such as re-arrangement of furniture or addition of new items, to maintain an accurate representation of the interior layout; and
    integrating the comprehensive interior layout model with the item tracking system to enhance the precision of locating items within the designated space, based on their spatial context and proximity to identified landmarks within the model.

11. The method of claim 1, further comprising employing augmented reality (AR) technology to visually guide users to the location of specific items within the designated space, leveraging the detailed understanding of interior layout and spatial relationships.

* * * * *